Figures 1, 2:
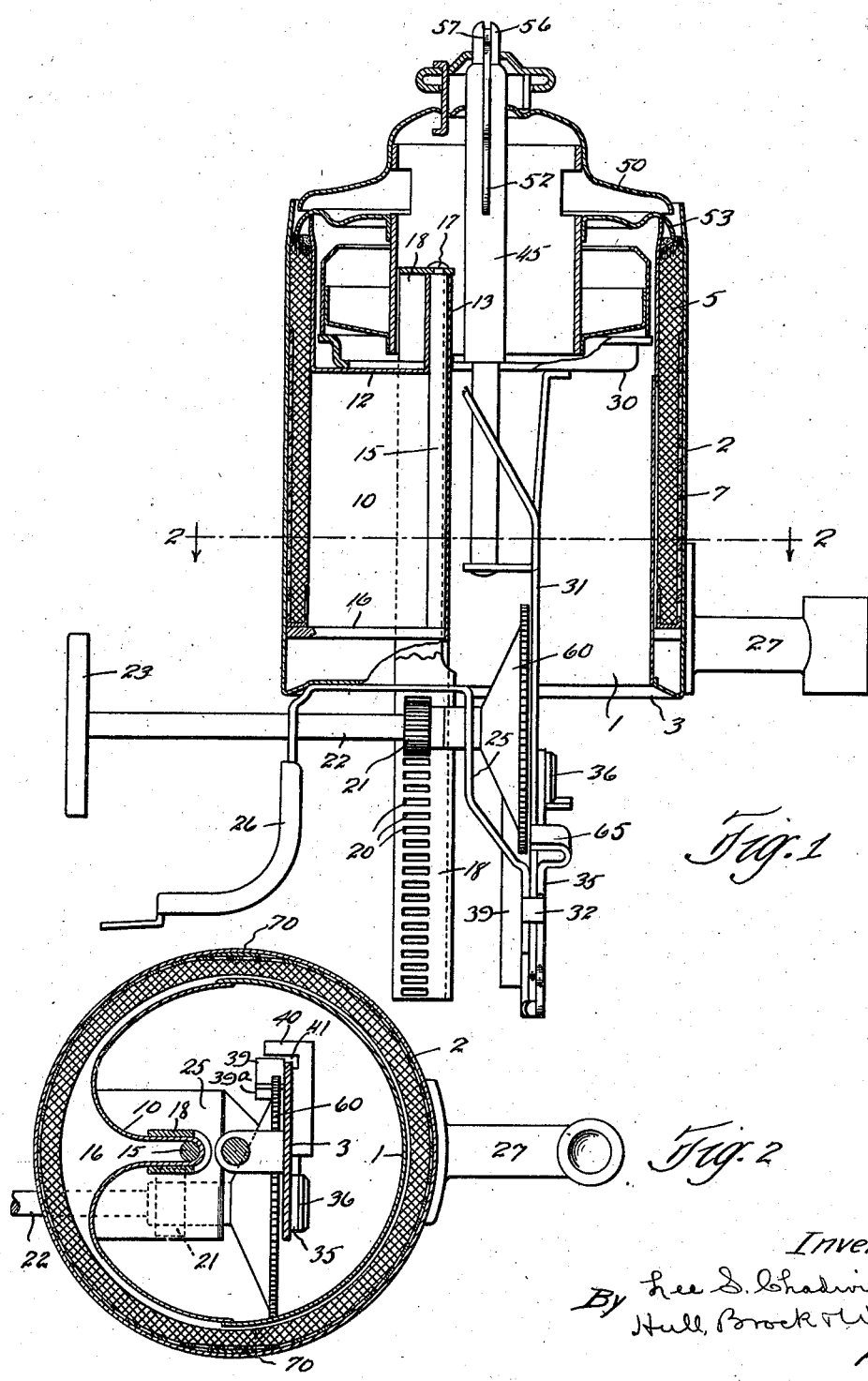

Oct. 23, 1923.

L. S. CHADWICK 1,471,542

AUTOMATIC WICK STOP

Filed Jan. 12, 1922

8 Sheets-Sheet 1

Inventor
Lee S. Chadwick
Hull, Brock & West
Attys.

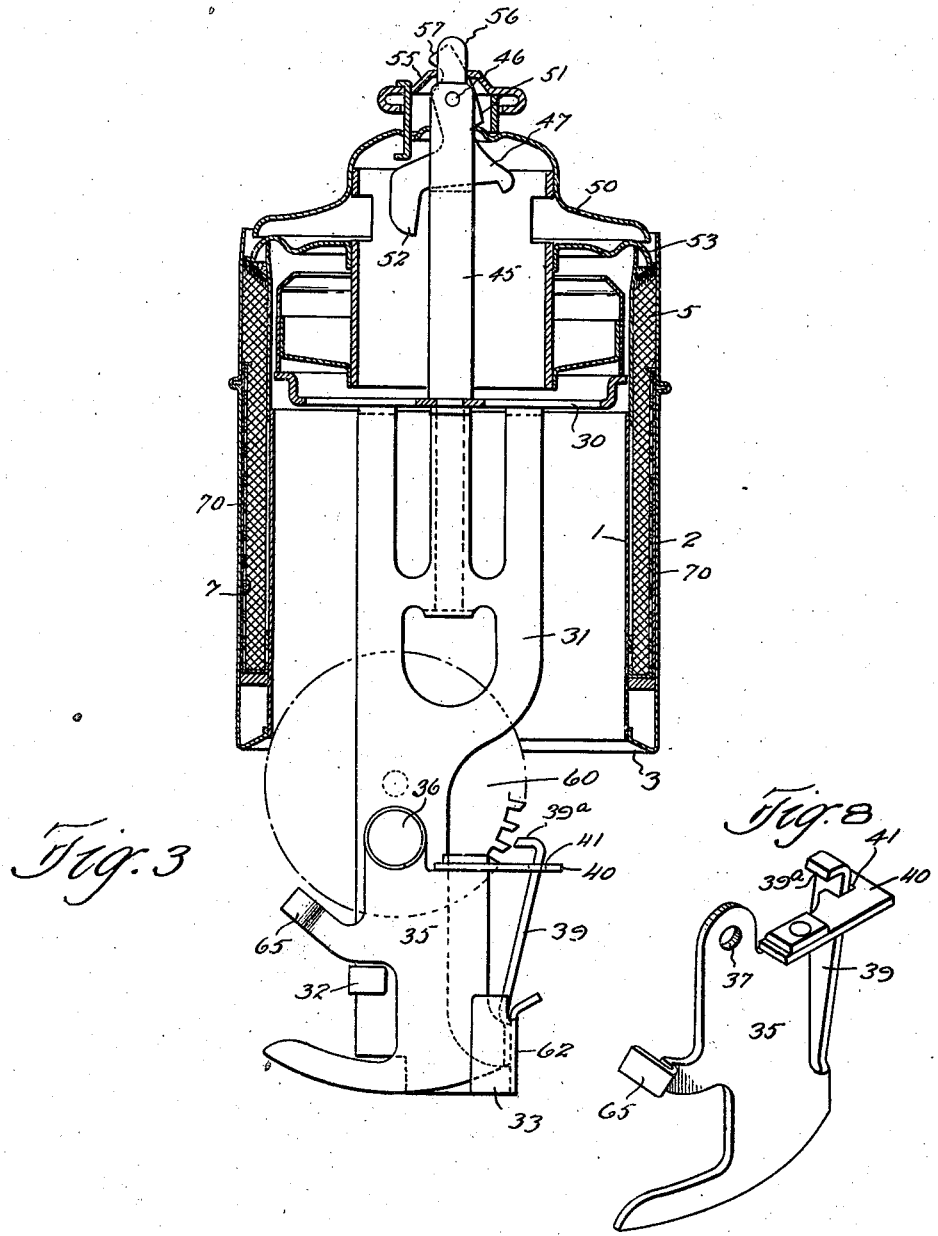

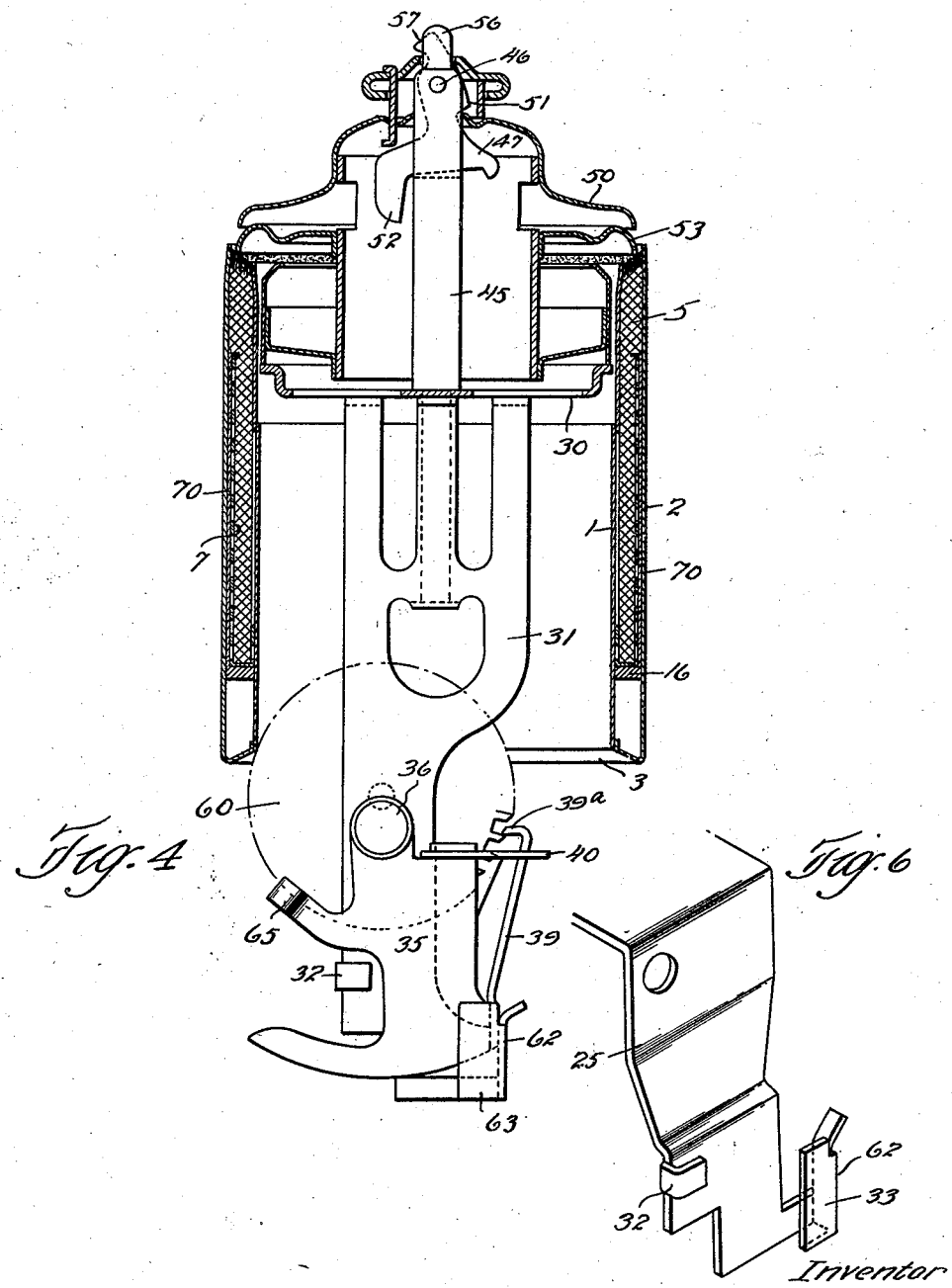

Oct. 23, 1923.
L. S. CHADWICK
1,471,542
AUTOMATIC WICK STOP
Filed Jan. 12, 1922
8 Sheets-Sheet 4
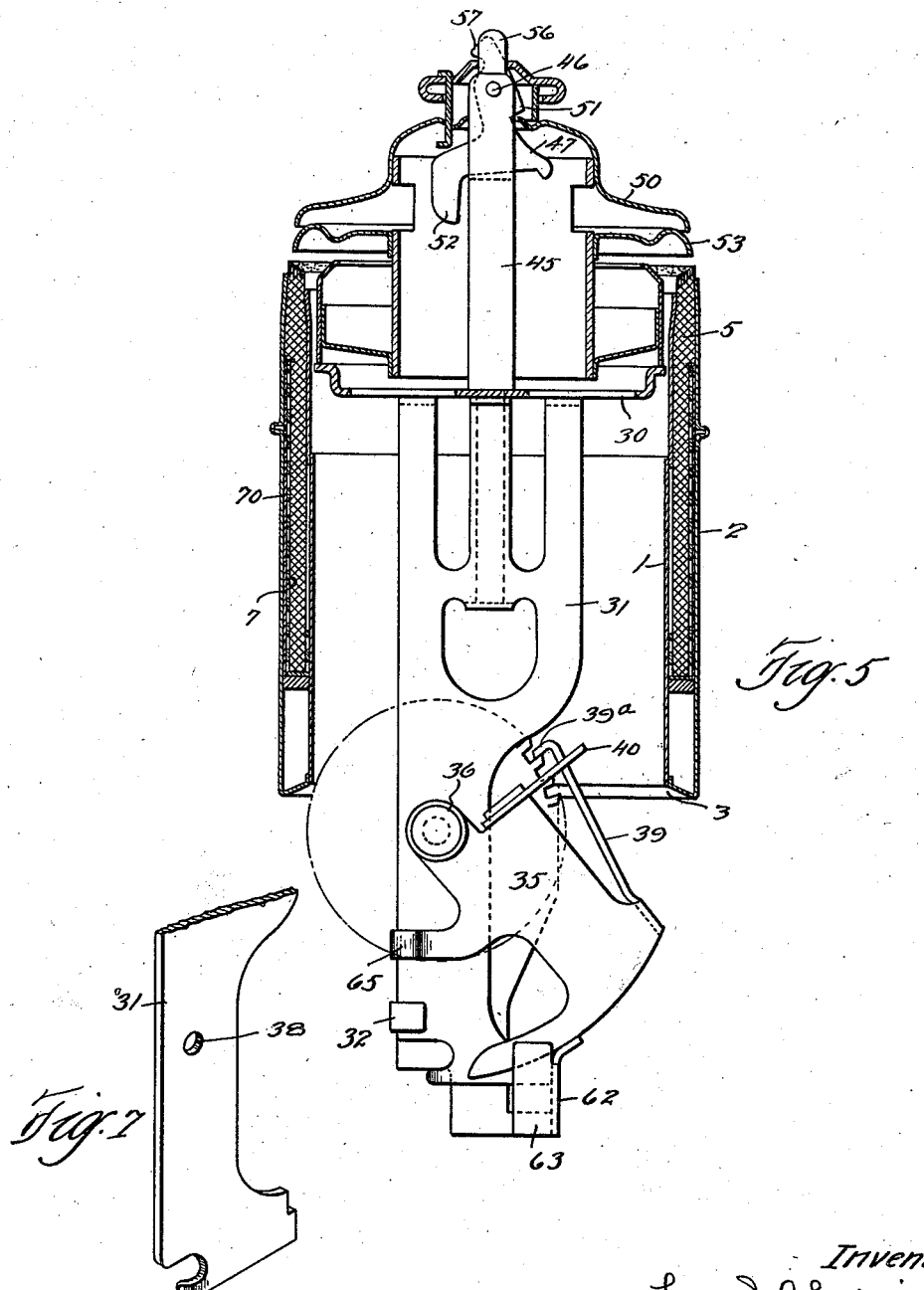

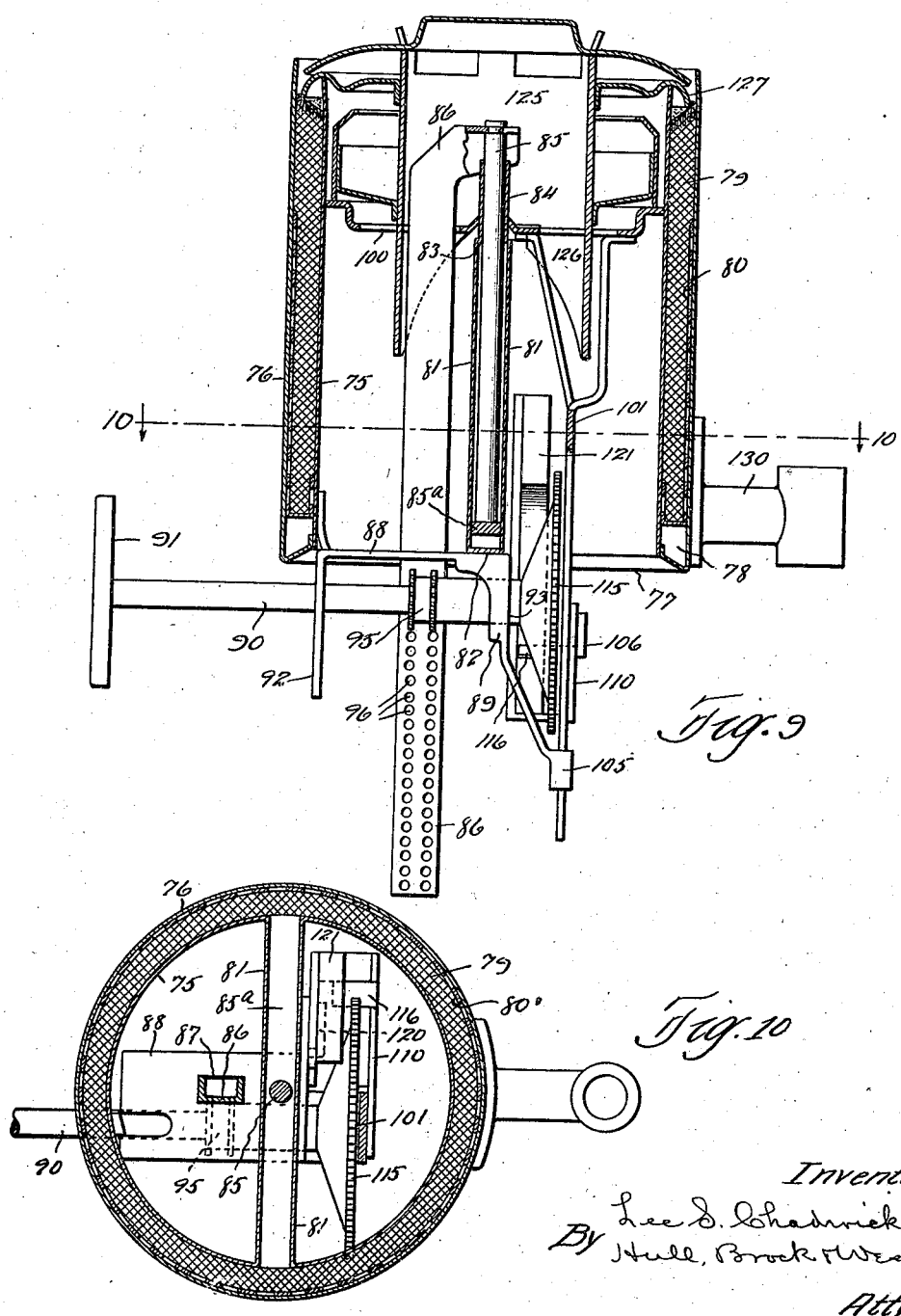

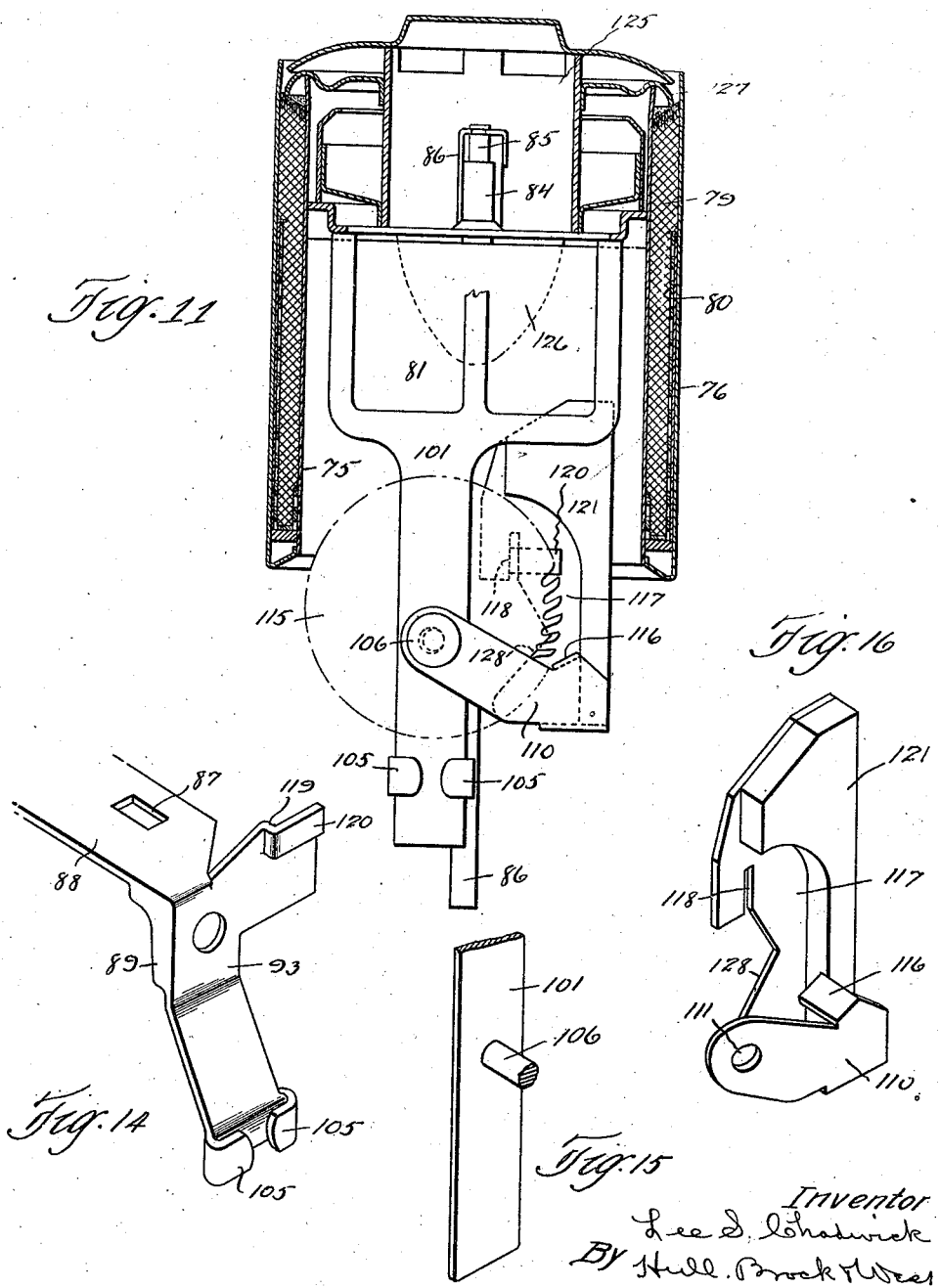

Oct. 23, 1923.

L. S. CHADWICK 1,471,542

AUTOMATIC WICK STOP

Filed Jan. 12, 1922

8 Sheets-Sheet 7

Inventor
Lee S. Chadwick
By Hull, Brock & West
Attys.

Oct. 23, 1923.

L. S. CHADWICK 1,471,542

AUTOMATIC WICK STOP

Filed Jan. 12, 1922

8 Sheets-Sheet 8

Inventor
Lee S. Chadwick
By Hull, Brock & ...
Attys.

Patented Oct. 23, 1923.

1,471,542

UNITED STATES PATENT OFFICE.

LEE S. CHADWICK, OF SHAKER HEIGHTS, OHIO, ASSIGNOR TO THE CLEVELAND METAL PRODUCTS COMPANY, OF CLEVELAND, OHIO, A CORPORATION OF OHIO.

AUTOMATIC WICK STOP.

Application filed January 12, 1922. Serial No. 528,813.

*To all whom it may concern:*

Be it known that I, LEE S. CHADWICK, a citizen of the United States, residing at Shaker Heights, in the county of Cuyahoga and State of Ohio, have invented a certain new and useful Improvement in Automatic Wick Stops, of which the following is a full, clear, and exact description, reference being had to the accompanying drawings.

This invention relates to liquid fuel burners employing wicks and incorporating stop mechanism that, while being engaged and set in operative condition by the wick, engages or locks with something other than the wick for preventing the raising of the wick above a safe position.

In burners of the class referred to it is necessary to trim or wipe off the charred portion of the wick from time to time which results in a gradual shortening of the wick, and consequently the stop mechanism has to be adjusted occasionally with respect to the part wherewith it cooperates to compensate for the variation in the length of the wick. This adjustment, being left as it has in the past to the attention of the user, is frequently neglected or totally disregarded and therefore avails little or nothing in the promotion of safety.

I call attention to a distinction between the class of burners to which my present improvements are directed, wherein the stop mechanism acts on something other than the burned portion of the wick, and the class wherein the wick is stopped by direct engagement of its burned portion with a stop or abutment. Obviously, the former arrangement, or that in which we are at present interested, is much more desirable than the latter, inasmuch as it leaves the burned portion of the wick entirely free and unobstructed so that there is nothing to impair the character of the flame It is my aim to provide a liquid fuel burner involving stop mechanism for preventing undue elevation of the wick and which automatically adjusts itself to the variation in the length of the wick, thus eliminating the human element which heretofore had to be relied upon; and to utilize the burned portion of the wick, since this is the only part affected by the wiping off or trimming of the wick, for setting in operation the wick stop mechanism thereby assuring at all times a definite relation between such portion of the wick and said mechanism.

My present invention is one of a series which I have recently contributed to the attainment of this general aim, my former efforts being disclosed in my pending applications Serial Nos. 448,108 and 448,109, filed February 26, 1921; and Serial No. 449,842, filed March 5, 1921, the present invention being more closely allied with that which constitutes the subject matter of application No. 448,109 aforesaid.

In the present, as in my former inventions, the stop mechanism is set in operation by an abutment which is engaged by the burned portion of the wick and which withdraws itself from such portion after it has performed said purpose, the principal distinction of my present invention over its predecessors being in the utilization of an air distributing or controlling member, in the present embodiment the flame spreader, as such abutment.

Further objects of a general nature are to provide a substantial and durable construction which is comparatively simple, thoroughly reliable, and is economical of manufacture and through which the ends related above may be attained in a highly efficient manner.

A still further and more specific object is to provide, in an oil burner of the type comprising inner and outer wick tubes between which the wick is adapted to be raised and lowered by means of a spindle and in operative relation to the upper ends of which tubes a flame spreader is supported, stop mechanism for limiting the rotation of the spindle, which mechanism is under the control of the flame spreader to the end that when the wick engages and lifts the flame spreader it sets said stop mechanism in operative condition and couples the spreader with the spindle in such manner as to cause the spreader to be moved in advance of the wick to a position wherein it functions purely as a flame spreader; the connections between the stop mechanism and spindle being of such nature as to allow the spindle to rotate and raise the wick a limited distance after the spreader has been lifted to its elevated position. While I have here specified a flame spreader as the actuator for the stop mechanism, it will be understood that any air distributing or controlling member serving as an actuator for said mechanism shall be regarded a full equivalent thereof.

Another object of the invention is to provide in mechanism of the aforementioned nature an adjustable stop through which the maximum elevation of the wick may be varied.

Another object is to provide mechanism involving a ratchet wheel, and a pawl arranged for approximate tangential engagement therewith, said pawl yielding in a direction substantially at right angles to the direction of its travel so as to prevent a locking action between the nose of the pawl and a point on a tooth of the ratchet wheel. Also to provide a stop for limiting the yielding movement of the pawl.

A further object comprehended by the invention is to provide a unique connection between the flame spreader and stop mechanism which renders the removal and replacement of the spreader particularly easy, the connection automatically assuming effective condition when the spreader is inserted within the upper end of the wick tubes.

Embodiments serving to illustrate the invention are shown in the accompanying drawings and while I shall proceed to describe them in detail, it will be understood that I do not limit myself to the structural features thereof further than is required by the terms of the claims annexed hereto.

Figure 12:
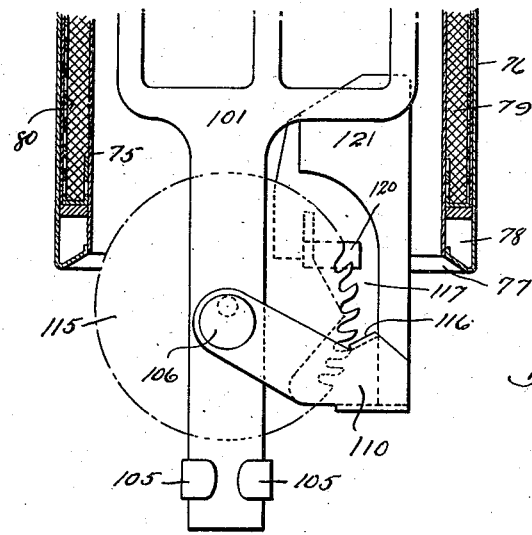
Figure 13:
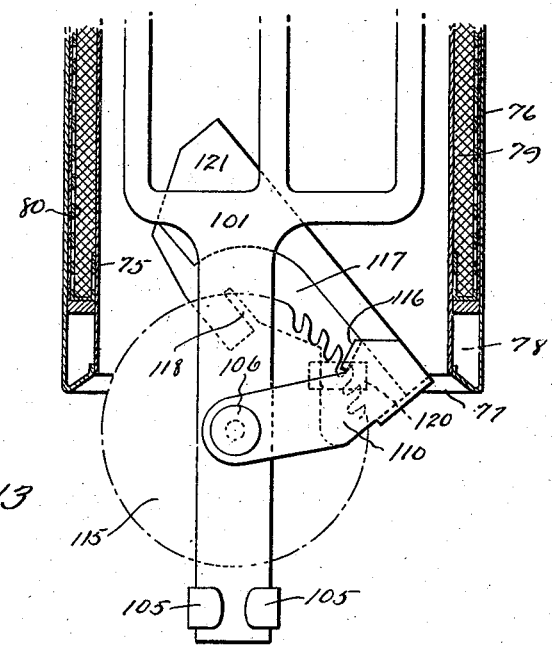
Figure 17:
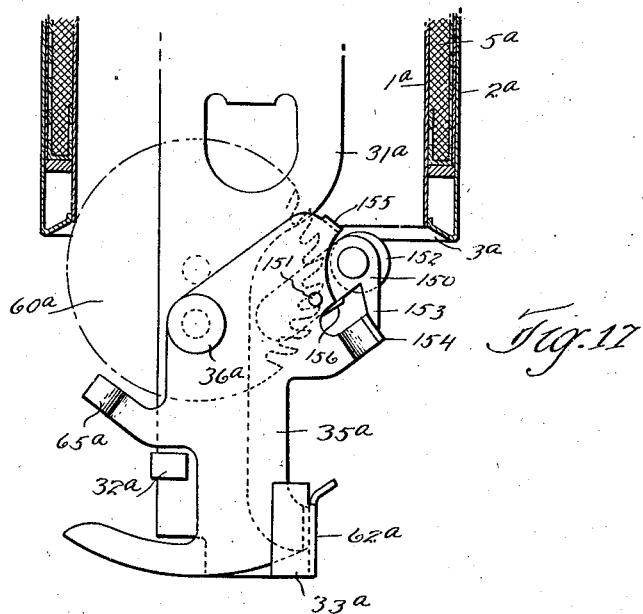
Figure 18:
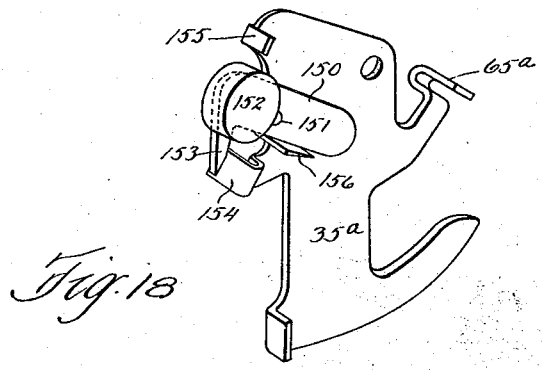

In the drawings, Fig. 1 is a sectional side elevation of a burner incorporating my improvements, the plane of section being parallel to the axis of the wick raising spindle; Fig. 2 is a horizontal section through the burner on the line 2—2 of Fig. 1; Fig. 3 shows the burner in sectional side elevation, at right angles to the plane of Fig. 1, the wick being down and the wick stop mechanism in ineffective condition; Fig. 4 is a similar view showing the wick partially elevated and certain parts movable with the wick in what may be termed intermediate position; Fig. 5 is a view, similar to Figs. 3 and 4, and showing the wick at its maximum high position and the stop mechanism in effective condition; Fig. 6 (Sheet 3) is a fragmentary perspective view of a bracket which depends from the burner and whereby certain parts of the stop mechanism are guided; Fig. 7 (Sheet 4) is a similar view of a frame which constitutes a part of the stop mechanism; Fig. 8 (Sheet 2) is a perspective view of the pawl and stop carrying member of the stop mechanism; Fig. 9 is a sectional side elevation of a burner incorporating a modified form of my invention; Fig. 10 is a section on the line 10—10 of Fig. 9; Fig. 11 is a sectional view through the burner at right angles to Fig. 9; Figs. 12 and 13 are fragmentary sectional views corresponding in their plan of section with that of Fig. 11 but showing the stop mechanism in intermediate position and in effective condition, respectively; Fig. 14 is a fragmentary perspective view of a bracket employed in the later form of my invention; Fig. 15 is a similar view of the slide; Fig. 16 is a perspective view of the weighted pawl and stop; Fig. 17 is a sectional detail showing a construction that distinguishes from the previous forms by employing a pivoted pawl; and Fig. 18 is a perspective view showing the pawl carrying member and the pawl pivoted thereto.

The burner illustrated in Figs. 1 to 5 comprises inner and outer wick tubes 1 and 2 that are joined together at lower ends by a wall 3 so as to enclose an annular wick space or compartment wherein a tubular wick 5 is supported by a wick carrier 7. The inner wick tube 1 has an offset 10 which extends radially inward and is closed at the bottom by a wall 11 and at the top by a wall 12, the latter having a tubular extension 13 through which a rod 15 extends that has connection at its lower end, through a member 16, with the wick carrier 7. The upper end of the rod 15, where it projects beyond the tubular extension 13, has connection at 17 with a rack member 18. This member is preferably formed of sheet metal and extends a considerable distance below the burner tubes where it is U-shaped in cross section, while thereabove and throughout the remainder of its length its curved side is cut away leaving only side plates that are turned inwardly and overlapped at their upper ends for connection with the rod 15 as aforesaid. The nearer side of the lower portion of the member 18 (as it is viewed in Figs. 1 and 2) is provided with a series of slots 20, thus constituting of it a rack for engagement with the teeth of a pinion 21 on a spindle 22 which may be turned by a hand wheel 23 applied to its outer end. The spindle is journaled within opposed parts of a bracket 25 that is secured to and depends from the burner.

It may be explained in passing that, in the present construction, the burner is intended to be supported from the base of a stove through a member 26 that is applied to the forward end of the bracket 25 and which is arranged to have connection with the base, and through an elbow fitting 27 that extends rearwardly from the lower end of the outer wick tube 2 and is arranged for connection with a suitable supply pipe, the fitting 27 providing communicative connection between the supply pipe and burner.

It will be seen from what has already been described that by turning the spindle 22 the wick 5 may be raised and lowered by reason of its operative connections with the spindle through the carrier 7, member 16, rod 15, rack member 18, and pinion 21.

A spanner 30 is movable within the upper end of the inner wick tube. Depending from this spanner is a frame 31 which has its lower end (shown in perspective in Fig. 7) guided between overturned portions 32 and 33 of the rear branch of the bracket 25 (shown in perspective in Fig. 6). A pawl carrying member 35, shown in perspective in Fig. 8, is pivotally connected to the frame 31 by means of a pivot member 36 which extends through registering apertures 37 and 38 of the pawl carrying member and frame, respectively. The pawl carrying member (like practically all other parts of the burner) is shown as formed of sheet metal, and made integral therewith is a pawl 39 which has a forwardly directed nose 39ª at its upper end. Through the inherent resiliency of the metal from which the member 35 is made, the pawl 38 is yieldable with respect to said member, and the extent to which it may yield is limited by a stop plate 40 which is carried by the member 35 and has a notch 41 that embraces the pawl and is of somewhat greater width than the thickness of the metal whereof the pawl is formed.

Rigidly secured to the spanner 30 and rising centrally therefrom is a post 45 which is bifurcated at its upper end, and within the bifurcation of the post is pivotally supported, upon a pin 46, a latch plate 47. A flame spreader 50 is adapted to be inserted within the upper end of the burner and it has an aperture in its top wall through which the upper end of the post 45 projects, and when the spreader is in normal position with respect to the post, a keeper portion 51 of the latch plate 47 is projected over the top wall of the spreader due to the direction in which the latch plate is tilted by its weighted end 52. When the spreader is in this locked position, its flange 53 extends out over the wick space and in the path of the wick 5, and when the spanner 30 is in low position, the flange 53 is well below the upper edge of the wick tubes. An actuator 55 is movably carried by the spreader and the same is in the form of a collar which surrounds the reduced upper end 56 of the post 45 and by cooperation with a lateral extension 57 of the latch plate 47, swings the latch plate upon its pivot to retract its keeper portion 51 when said actuator is elevated. The actuator 55, constituting a lifter for this spreader, serves to unlatch the spreader from the post 45 by its engagement with the extension 57 during its slight initial movement in advance of the upward movement of the spreader. From this brief description it is clear that by taking hold of the actuator 55 and lifting it, the flame spreader will be unlatched from the post 45 and removed from the burner; and upon returning the spreader to the burner it will be automatically locked to the post 45 by the action of the weighted latch plate 47. For further details regarding this spreader latch, reference may be had to the copending application of myself and one Mark Resek entitled "Latches for flame spreaders of oil burners" and filed concurrently herewith.

Secured rigidly to the inner end of the wick raising spindle 22, adjacent the frame 31, is a ratchet wheel 60 which, it will be observed, is of considerably greater radius than the pinion 21. I have already explained how, when the spindle is rotated in an appropriate direction, the wick 5 may be elevated. As the wick rises it engages the flange 53 of the flame spreader, and through the latter's connection with the spanner 30 and frame 31, through post 45, will lift the frame and consequently elevate the pawl carrying member 35. The initial upward movement of the pawl carrying member (compare Figs. 3 and 4) is restricted to a vertical course by the wall 62 of the overturned portion 33 of the bracket 25. This vertical course of the pawl carrying member imparts a like direction of travel to the pawl 39 which is approximately tangent to the gear 60. Just as soon as the pawl has been elevated enough to enter the orbit of the gear teeth, the gear will pick it up and, by reason of the greater radius of the gear with respect to that of the pinion 21, the pawl carrying member, the frame and spanner structure, and together therewith the flame spreader 50, will be lifted at a considerably higher rate of speed than that at which the wick 5 is traveling. This upward movement of the parts mentioned continues until the flame spreader assumes its high position, wherein it functions purely as a flame spreader, and the stopping of the parts with the spreader in this position is caused by the withdrawal of the lower end of the pawl carrying member from the vertical portion of the wall 62. The lower end of the pawl carrying member is curved on an arc concentric with the pivotal axis of said member, and the upper end of the wall 62 is deflected laterally at an angle to provide a bearing surface for the lower end of the pawl carrying member as it is swung by the gear 60 laterally over the top of said wall, as indicated in Fig. 5. This swinging of the pawl carrying member occurs when its pivotal axis is substantially coincident with the axis of the spindle 22 and this is for the purpose of allowing further rotation of the spindle after the flame spreader has assumed high position so as to elevate the wick to its maximum heighth, as illustrated in said Fig. 5. The upward movement of the wick, however, is arrested, in turn, by the engagement of a stop 65 with the adjacent edge of the frame 31. The stop 65 is shown as formed integral with the pawl carrying member 35 and as consisting of a tongue which is turned laterally so as to abut the edge of the aforesaid frame. This stop is preferably adjustable (in the present instance, by reason of the flexibility of the metal whereof it is formed) so as to enable the high position of the wick to be varied to meet varying climatic conditions and different grades of fuel oil, etc., some oils requiring greater wick exposure than others as does also varying atmospheric or climatic conditions.

I have already made mention of the fact that the pawl 39 is yieldable. This is for the purpose of avoiding the pawl locking with a gear tooth should the nose of the pawl engage squarely on the point of the tooth.

While I have described in passing the operation of the various parts, I may explain briefly that when the burner is in use and the user wishes to clean the wick, or replace a consumed wick by a new one, the flame spreader is removed by lifting it through the medium of the collar or actuator 55, which, as previously explained, automatically unlatches the flame spreader from the post 45. With the flame spreader removed, the wick has a clear upward course. The spindle 22 is turned to the right (as the parts are herein illustrated) and, in the absence of the flame spreader, there being nothing to lift the frame 31, the wick stop mechanism will not be thrown into operative condition so that the wick may be raised until its upper end protrudes enough above the tubes for cleaning purposes, or until the carrier 7 is exposed sufficiently above the upper end of the wick tubes to allow the same to be lifted therefrom. A new wick, equipped with its own carrier, may now be inserted between the tubes and pressed down until it engages the member 16 and until holding prongs, indicated in a general way at 70 in Fig. 2, take hold of the upper edge of the carrier, the toothed upper edges of said prongs being indicated in said view in dotted lines. This feature will constitute the subject matter of a divisional application and further illustration of it in this connection is thought to be unnecessary. With the wick now locked to the member 16, the spindle 22 may be rotated in a direction to retract the wick and sufficiently to draw it completely into the wick space. The flame spreader is then lowered into the upper end of the burner over the post 45 and is automatically latched thereto by the swinging of the latch plate 47 to normal position under the action of its weighted end 52. The burner is now in readiness for use. When it is desired to light the wick, the wick is elevated by turning the spindle 22 in an appropriate direction and upon the initial upward movement imparted to the flame spreader by the engagement of the wick with its flange 53 the frame 31 and the pawl carrying member 35 will be elevated sufficiently to present the nose of the pawl in the path of the teeth of ratchet 60 whereupon the ratchet picks up the pawl and through it, and the member 35, frame 31 and spanner 30, lifts the flame spreader 50 out of contact with the wick, this action continuing until the lower edge of the pawl carrying member escapes over the upper end of wall 62, thereafter leaving the flame spreader at rest while allowing the wick to continue upwards until the parts are arrested in their movement by the engagement of stop 65 with the adjacent edge of the frame 31.

The embodiment illustrated in Figs. 9 to 16 is quite similar to that above described, and with an understanding of the previous form, the construction and operation of the present modification will be readily comprehended from the following brief description.

The burner is made up of inner and outer wick tubes 75 and 76, respectively, that are joined at their lower ends by an annular wall 77 thereby to enclose a space 78 which contains the tubular wick 79 equipped with a carrier 80.

Walls 81, spaced a suitable distance apart, extend diametrically across the inner wick tube and the space therebetween is closed at the lower end by a wall 82, and at the upper end by a wall 83 which has a tubular extension 84 through which a rod 85 projects, the rod having attached to its lower end a cross bar 85$^a$ which is adapted to have separable connection through suitable means (not shown) with the wick carrier 80. At its upper end, the rod 85 has connection with a rack member 86 that depends along one side of one of the walls 81 and is guided through an aperture 87 in the horizontal portion 88 of a bracket 89 which is attached to the lower end of the burner. The wick raising spindle 90, equipped at its outer end with a hand wheel 91, is journaled in opposed parts 92 and 93 of the bracket 89, and has secured to it a pinion 95 (shown double, in the present instance) which meshes with apertures 96 in the rack member 86, so that when the spindle is rotated it will, through the rack member 86, rod 85, and cross bar 85$^a$, raise and lower the wick.

A spanner 100 is suported for vertical movement within the upper end of the inner wick tube 75, and attached thereto is a frame 101 which has its lower end guided by overturned portions 105 of the part 93 of bracket 89. Pivotally supported upon a member 106, that is carried by the frame 101, is a weighted pawl 110, shown in perspective in Fig. 16, the aperture 111 through which the pivotal member 106 extends being somewhat larger than the cross section of said pivotal member where it extends through the aperture so that the pawl may yield laterally of the frame 101. A ratchet wheel 115, similar to the wheel 60 of the former modification, is secured to the inner end of the spindle 90, and the nose 116 of the pawl 110 is arranged for cooperation with the teeth of the ratchet wheel when the pawl is lifted in reach thereof. The pawl incorporates a plate 117 which has a notch 118 that normally embraces a guide wall 119, shown as formed integral with the bracket 89 and as joining to the body portion of said bracket a part 120 between which, and the adjacent body portion, the plate 117 is guided. When the parts are in normal position, as illustrated in Fig. 11, the notch 118 embraces the guide wall 119, and the nose 116 of the pawl is downward beyond the reach of the teeth of ratchet 115. The pawl is equipped with a weight 121 which tends to rock the lower end of the pawl rearwardly as the structure hangs from the guide wall 119 so as to retain the nose of the pawl 116 to the limit of its movement toward the teeth of the ratchet.

A flame spreader 125 is locked to the spanner 110, as by means of hooks 126, and its flange 127 extends out over the wick space so that the wick, when elevated, will engage said flange and lift the flame spreader, causing upward movement to be imparted to the spanner 100 and consequently to the frame 101, lifting the pawl 110 until its nose 116 is projected into the path of the teeth of ratchet 115 (see Fig. 12). Should the nose of the pawl engage squarely the end of one of the ratchet teeth the pawl may yield by reason of its loose connection with the pivotal member 106 sufficiently to dislodge it from said tooth, allowing it to be picked up by the next tooth. The pawl 110, being restrained from oscillation by the engagement of its notch 118 with the guide wall 119, will rise vertically until the pivotal axis of the pawl is substantially coincident with the spindle 90, which occurs when the notch 118 withdraws from the guide wall 119. During this time, the spreader 125 has been elevated to its high position where it remains at rest, while the pawl 112 swings in an arcuate course in response to the rotation of the ratchet 115 until it is stopped by the engagement of its edge portion 128 with the guide wall 119, in which position the parts are illustrated in Fig. 13. This arrests the movement of all parts and determines the maximum high position of the wick.

The wick space 78 is supplied with oil through the elbow fitting 130 that is secured to and extends laterally from the lower end of the wick tube 76.

The form of the invention shown in Figs. 17 and 18 is distinguished from that illustrated in Figs. 1 to 8 by the pawl 150 being pivoted at 151 to the pawl carrying member 35ª (the same reference numerals applying to the corresponding parts in both instances except that in connection with the latter form they are augmented by the exponent "a"). The outer end of the pawl is normally depressed by a weight 152 that is carried thereby. When in such condition it is positioned by the engagement of its abutment portion 153 with a stop 154 on the pawl carrying member 35ª. The pawl is free to swing between this and a second stop 155 on said member when adjusting itself to allow its nose 156 to ride off a tooth of the ratchet wheel 60ª wherewith said nose has come into endwise engagement.

Having thus described my invention, what I claim is:

1. In a burner of the class set forth, in combination with a wick, stop mechanism limiting the upward movement of the wick, and means for rendering the stop mechanism operative, said means incorporating a flame spreader that is adapted to be engaged and moved by the burned portion of the wick and arranged to automatically withdraw therefrom when the wick is in burning position.

2. In a burner of the class set forth, in combination with the wick, a flame spreader arranged to be engaged and moved by the wick, means engaging a part of the wick other than its burned portion and between which and the wick there is an interdependency of movement, stop mechanism arranged to act through said means for limiting the upward movement of the wick, and operative connections between the flame spreader and said stop mechanism whereby the latter is set in operative condition by the former.

3. In a burner of the class set forth, in combination with the wick, a flame spreader arranged to be engaged and moved by the wick, stop mechanism for limiting the upward movement of the wick, and operative connections between the flame spreader and said stop mechanism whereby the latter is set in operative condition by the former, and means whereby the flame spreader is automatically withdrawn from the wick when the latter is in burning position.

4. In a burner of the character set forth, in combination with the wick, wick raising means, a flame spreader arranged to be engaged and moved by the wick, stop mechanism for limiting the movement of the wick raising means, said stop mechanism being operatively connected to the wick raising means by the initial elevation of the flame spreader, and the flame spreader thereby being coupled to the wick raising means so as to be withdrawn from the wick by the action of said means.

5. In a burner of the class set forth, in combination with a wick, means for raising the wick, a stop for limiting the movement of said means, a flame spreader arranged to be engaged and moved by the wick, means for elevating the flame spreader to normal operative position, and connections actuated by the initial movement of the flame spreader for rendering effective the stop and the spreader elevating means.

6. In a burner of the class set forth, in combination with the wick, wick raising means, a prime mover having operative connection with the wick raising means, a flame spreader arranged to be engaged and moved by the wick when the latter is elevated, mechanism adapted to elevate the flame spreader to normal operative position and arranged when thrown into connection therewith to limit the movement of the wick raising means, and connections between the spreader and said mechanism whereby said mechanism is operatively connected to the prime mover by the initial elevation of the flame spreader.

7. In a burner of the class set forth, in combination with the wick, a prime mover, wick raising means operatively connected to said prime mover, a flame spreader arranged to be engaged and moved by the wick when the latter is elevated, mechanism adapted to be connected to the prime mover for elevating the flame spreader to normal operative position above the wick and for arresting movement of the prime mover thereby to limit the upward movement of the wick, and means actuated by the initial movement of the flame spreader for coupling said mechanism to the prime mover.

8. In a burner of the class set forth, in combination with the wick, wick raising means, a prime mover operatively connected to said means, a flame spreader adapted to be inserted within the upper end of the burner in a position to be engaged and moved by the wick when the latter is elevated, mechanism for elevating the flame spreader to normal operative position above the wick and for limiting the movement of the prime mover thereby to prevent undue elevation of the wick, the initial elevation of the flame spreader serving to couple said mechanism to the prime mover, and means operating automatically to lock the flame spreader to the aforesaid mechanism when the flame spreader is inserted in the burner.

9. In a burner of the class set forth, in combination with the wick, wick raising means, a flame spreader arranged to be engaged and moved by the wick when the latter is elevated, mechanism which when coupled to the wick raising means serves to limit the movement of said means and to elevate the flame spreader to normal operative position above the wick, and means actuated by the initial movement of the flame spreader for coupling said mechanism to the wick raising means.

10. In a burner of the class set forth, in combination with the wick, wick raising means, an air controlling member removably supported in operative relation to the wick and arranged to be engaged and moved by the wick when the latter is elevated, mechanism which when coupled to the wick raising means serves to limit the movement of said means and to elevate the air controlling member to normal operative position above the wick, and means wherewith the air controlling member has separable connection and actuated by the initial movement thereof for coupling said mechanism to the wick raising means.

11. In an oil burner, the combination with the wick, means for raising the wick, stop mechanism coacting with the wick raising means for limiting the upward movement of the wick, an air distributing member arranged to be engaged and moved by the wick, and operative connections between said member and the stop mechanism whereby the latter is coupled to the wick raising means when the former is engaged and moved by the wick.

12. In a burner of the class set forth, in combination with the wick, wick raising means, a ratchet wheel rotated by the wick raising means, an air controlling member arranged to be engaged and moved by the wick, a pawl carrying member connected to the air controlling member, a pawl connected to the pawl carrying member and adapted to be engaged with the teeth of the ratchet wheel when said pawl carrying member is elevated by the air controlling member, the connections thus established between the ratchet wheel and air controlling member causing the air controlling member to be withdrawn from the wick through the action of the wick raising means, and means limiting the rotation of the ratchet wheel thereby to arrest movement of the wick raising means, said means for limiting the rotation of the ratchet wheel being adjustable thereby to vary the maximum elevation of the wick.

13. In a burner of the class set forth, in combination with the wick, wick raising means, a ratchet wheel rotated by the wick raising means, an air controlling member arranged to be engaged and moved by the wick, a pawl carrying member connected to the air controlling member, a pawl yieldably connected to the pawl carrying member and adapted to be engaged with the teeth of the ratchet wheel when said pawl carrying member is elevated by the air controlling member, the connections thus established between the ratchet wheel and the air controlling member causing the air controlling member to be withdrawn from the wick through the action of the wick raising means, and means limiting the rotation of the ratchet wheel thereby to arrest movement of the wick raising means.

14. In a burner of the character set forth, in combination with the wick, wick raising means, an air distributing member arranged to be engaged and moved by the wick, operative connections adapted to be established between the air distrubuting member and the wick raising means by the initial movement of said member by the wick, the establishment of said connections causing the air distributing member to be moved by the wick raising means and at a higher rate of speed than that at which the wick travels, means limiting the upward movement of the air distributing member, and means incorporated within the aforesaid connections for limiting the movement of the wick raising means.

15. In a burner of the character set forth, in combination with the wick, wick raising means, an air distributer arranged to be engaged and moved by the wick, operative connections established between the air distributer and the wick raising means by the initial movement of the distributer by the wick, the wick raising means serving upon the establishment of said connections to elevate the air distributer at a faster rate of speed than that at which the wick travels, and an adjustable stop incorporated in the aforesaid connections for limiting the movement of the wick raising means thereby to restrict the wick against undue elevation while permitting the maximum elevation of the wick to be varied.

16. In a burner of the character set forth, in combination with the wick, rotative wick raising means, a member arranged to be engaged and moved by the wick when the wick is elevated, operative connections established betwen said member and the wick raising means by the initial upward movement of said member, said connections incorporating an element capable of both rotative and vertical movement, means restricting the initial mevement of said element to a vertical course, the element thereafter rotating with the wick raising means, and a stop for limiting the rotative movement of said element.

17. In a burner of the character set forth, in combination with the wick, rotative wick raising means, a member arranged to be engaged and moved by the wick when the wick is elevated, operative connections established between said member and the wick raising means by the initial upward movement of said member, said connections incorporating an element capable of both rotative and vertical movement, means restricting the initial movement of said element to a vertical course, the element thereafter rotating with the wick raising means, and an adjustable stop for limiting the rotative movement of said element.

18. In a burner of the class set forth, in combination with the wick, rotative wick raising means incorporating a ratchet wheel, a member arranged to be engaged and moved by the wick when the latter is elevated, operative connections adapted to be established between said member and the ratchet wheel by the initial upward movement of said member, a pawl carrying element incorporated in said connections and capable of vertical and rotative movement, a yieldable pawl carried by said element for engagement with the teeth of the ratchet wheel, means restricting the initial movement of the element to a vertical course during which movement the aforesaid pawl is engaged with the teeth of the ratchet wheel, and a stop for limiting the rotative movement of said element.

19. In a burner of the class set forth, in combination with the wick, rotative wick raising means incorporating a ratchet wheel, a member arranged to be engaged and moved by the wick when the latter is elevated, operative connections adapted to be established between said member and the ratchet wheel by the initial upward movement of said member, a pawl carrying element incorporated in said connections and capable of vertical and rotative movement, a pawl carried by said element for engagement with the teeth of the ratchet wheel, means restricting the initial movement of the element to a vertical course during which movement the aforesaid pawl is engaged with the teeth of the ratchet wheel, and an adjustable stop for limiting the rotative movement of said element.

20. In a burner of the class set forth, in combination with the wick, rotative wick raising means incorporating a ratchet wheel, a member arranged to be engaged and moved by the wick when the latter is elevated, operative connections adapted to be established between said member and the ratchet wheel by the initial upward movement of said member, a pawl carrying element incorporated in said connections and capable of vertical and limited rotative movement, and a pawl carried by said element for engagement with the teeth of the ratchet wheel.

21. In a burner of the character set forth, in combination with the wick, rotative means for raising the wick, a ratchet wheel incorporated in said means, a member arranged to be engaged and moved by the wick, a frame movable with said member, a pawl carrying element pivotally connected to the frame so as to be capable of both a vertical movement with the frame and a rotative movement with the ratchet wheel, a pawl carried by said element, means restricting the initial movement of said element to a vertical course which is effective until said element has been raised to a position wherein its pivotal connection with the frame is substantially coincident with the rotating axis of the ratchet wheel, a pawl carried by said element which is engaged with the teeth of the ratchet wheel during the initial vertical movement of said element, the element rotating with the ratchet wheel after its pivotal axis has assumed substantial alignment with the rotating axis of the ratchet wheel, and a stop for limiting the rotative movement of the element.

22. In a burner of the class set forth, the combination of a wick guide, means for raising and lowering the wick, a movable abutment arranged to be engaged and moved by the wick when the latter is elevated, stop mechanism for limiting the movement of the wick raising means, operative connections between said stop mechanism and the aforesaid abutment whereby said mechanism is coupled to the wick raising means upon the initial upward movement of the abutment, the connections being of such nature as to cause the abutment to be moved away from and suspended a suitable distance above, the wick and the wick raising means to be capable of moving the wick to a higher plane after the abutment is elevated as aforesaid.

23. In a burner of the class set forth, the combination of a wick guide, a flame spreader movably supported above the wick space of the guide, a wick mover incorporating a rack, a spindle having a pinion cooperating with the rack, a toothed wheel on the spindle that is of greater radius than the pinion, a frame movable with the spreader, a member pivotally connected to the frame, a pawl carried by said member for cooperation with the toothed wheel, the frame and member having parts cooperating to limit the angular movement of the member with respect to the frame, and means for normally restricting said member against pivotal movement whereby when the wick is elevated the spreader and consequently the frame are elevated to engage the pawl with the toothed wheel so that the frame through the pawl and member is lifted to move the spreader in advance of the wick, the member thereby being withdrawn from the restraining means so that the member may be swung on its pivot, the angular movement of the member permitting the toothed wheel to rotate while the frame and spreader are held stationary in consequence of which the wick may be elevated a limited distance independently of the spreader.

24. In automatic wick stop mechanism for oil burners, a sub-combination of elements involving a ratchet wheel, a pawl normally out of engagement with the teeth of said wheel and arranged to travel in a substantially straight course tangential to the ratchet wheel into engagement therewith, said pawl being mounted to yield in a direction transverse the direction of its travel whereby locking action between the point of the pawl and a tooth of the rachet wheel is prevented.

25. In automatic wick stop mechanism for oil burners, a sub-combination of elements involving a ratchet wheel, a pawl for cooperation, but normally out of engagement, with said wheel and arranged to travel in a substantially straight course tangential to the ratchet wheel, said pawl being mounted to yield in a direction transverse the direction of its travel whereby a locking action between the pawl and a tooth of the wheel is prevented, and a stop for limiting the yielding movement of the pawl.

In testimony whereof, I hereunto affix my signature.

LEE S. CHADWICK.